United States Patent
Perkins et al.

(10) Patent No.: US 6,739,509 B2
(45) Date of Patent: May 25, 2004

(54) REGISTRATION MARK DETECTION USING MATCHED FILTERING

(75) Inventors: Mark D. Perkins, Appleton, WI (US); Curtis J. Wisneski, Appleton, WI (US); Gregory M. Blincoe, Appleton, WI (US); Kenneth H. Suess, Appleton, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 172 days.

(21) Appl. No.: 09/970,012

(22) Filed: Oct. 3, 2001

(65) Prior Publication Data

US 2003/0062412 A1 Apr. 3, 2003

(51) Int. Cl.$^7$ ................................. G06K 7/00
(52) U.S. Cl. ........................................ 235/435
(58) Field of Search ...................... 235/454, 462.25, 235/492, 435, 436, 437; 234/1–3; 375/278, 318, 216

(56) References Cited

U.S. PATENT DOCUMENTS

| | | | |
|---|---|---|---|
| 3,249,940 A | | 5/1966 | Erickson |
| 3,801,956 A | | 4/1974 | Braun et al. |
| 3,875,415 A | | 4/1975 | Woodward |
| 3,961,171 A | | 6/1976 | Freeman |
| 3,963,098 A | * | 6/1976 | Lewis et al. ............ 187/394 |
| 3,987,278 A | | 10/1976 | Van Elzakker et al. |
| 4,074,258 A | * | 2/1978 | Dore' et al. .............. 341/13 |
| 4,095,225 A | | 6/1978 | Erikmats |
| 4,141,492 A | | 2/1979 | Michel et al. |
| 4,327,292 A | | 4/1982 | Wang et al. |
| 4,361,896 A | | 11/1982 | Garner |
| 4,371,264 A | | 2/1983 | Lacombat et al. |
| 4,402,610 A | | 9/1983 | Lacombat |
| 4,431,923 A | | 2/1984 | Wang et al. |
| 4,688,088 A | | 8/1987 | Hamazaki et al. |
| 4,837,715 A | | 6/1989 | Ungpiyakul et al. |
| 4,884,075 A | | 11/1989 | Mangelsdorf |
| 4,921,278 A | | 5/1990 | Shiang et al. |
| 5,018,212 A | | 5/1991 | Manns et al. |

(List continued on next page.)

FOREIGN PATENT DOCUMENTS

| | | | | |
|---|---|---|---|---|
| DE | 19853416 A1 | 6/1999 | | |
| EP | 0545701 A1 | 6/1993 | | |
| EP | 0545737 A1 | 6/1993 | | |
| EP | 0645770 A2 | 3/1995 | | |
| EP | 0729148 A2 | 8/1996 | | |
| EP | 0927649 A1 | 7/1999 | | |
| GB | 2126444 A | * | 3/1984 | ............ G08C/9/00 |
| JP | 60-222855 A2 | 11/1985 | | |
| JP | 05-291104 A2 | 11/1993 | | |

*Primary Examiner*—Diane I. Lee
(74) *Attorney, Agent, or Firm*—Senniger, Powers, Leavitt & Roedel

(57) ABSTRACT

A system and method for detecting a registration mark associated with an object which provides improved resolution between matching and non-matching inputs. The registration mark represents a binary code sequence. Upon detecting a sequence of bits with a sensor, the detected sequence is provided to a code matching filter, which compares the detected sequence with the binary code sequence and produces a detection signal. The code matching filter increases a value of the detection signal for each matching pair of compared bits, and decreases the value of the detection signal for each non-matching pair of compared bits. In this manner, a penalty is assessed for mismatches. This results in a filter output having a high amplitude in response to a matching input, and a low amplitude for non-matching inputs. The system may sample the detected sequence of bits in such a manner as to avoid potential edge timing problems.

20 Claims, 3 Drawing Sheets

U.S. PATENT DOCUMENTS

| | | |
|---|---|---|
| 5,046,110 A | 9/1991 | Carucci et al. |
| 5,073,932 A | 12/1991 | Yossifor et al. |
| 5,073,954 A | 12/1991 | Van Tyne et al. |
| 5,235,515 A | 8/1993 | Ungpiyakul et al. |
| 5,239,177 A | 8/1993 | Cunniff |
| 5,388,517 A | 2/1995 | Levien |
| 5,402,726 A | 4/1995 | Levien |
| 5,424,747 A | 6/1995 | Chazelas et al. |
| 5,552,611 A | 9/1996 | Enichen |
| 5,563,955 A | 10/1996 | Bass et al. |
| 5,745,528 A | 4/1998 | Fimoff et al. |
| 5,760,815 A | 6/1998 | Genovese |
| 5,765,083 A | 6/1998 | Shinohara |
| 5,766,389 A | 6/1998 | Brandon et al. |
| 5,818,719 A | 10/1998 | Brandon et al. |
| 5,828,075 A | 10/1998 | Siler et al. |
| 5,889,269 A | 3/1999 | Bridgelall et al. |
| 6,043,864 A | 3/2000 | Lo et al. |
| 6,064,486 A | 5/2000 | Chen et al. |
| 6,112,658 A | 9/2000 | Gunther et al. |
| 6,298,150 B1 | 10/2001 | Sonoda et al. |

\* cited by examiner

| LENGTH | CODE ELEMENTS |
|---|---|
| 2 | + - , + + |
| 3 | + + - , + - + |
| 4 | + + - + , + + + - |
| 5 | + + + - + |
| 7 | + + + - - + - |
| 11 | + + + - - - + - - + - |
| 13 | + + + + + - - + + - + - + |

REGISTRATION MARK DETECTION USING MATCHED FILTERING

FIELD OF THE INVENTION

The present invention relates to detecting a registration mark associated with an object, and more particularly to detecting a registration mark representing a binary code sequence using matched filtering.

BACKGROUND OF THE INVENTION

A vast number of applications exist in which it is necessary or desirable to monitor certain parameters related to an object. One common example is the need to monitor the position, velocity, acceleration, etc. of one or more components in a manufacturing process. For instance, in a largely automated process for manufacturing disposable diapers, certain components (e.g., absorbent pads, waist elastic bands, printed graphics, etc.) must be positioned or aligned with respect to other components (e.g., support layers, etc.) in order to produce an acceptable product. To facilitate this process, registration marks are commonly applied to certain components. These registration marks are then detected during the manufacturing process using sensors to determine parameters of interest including, for example, when a component is present at a particular location, where to position a particular component, etc.

Frequently, a registration mark is applied to an object as a single mark which, when detected by a sensor, produces a single pulse at the sensor output. This approach, however, sometimes results in detection errors. For example, noise in the system may falsely trigger the sensor output, or may prevent detection of the registration mark. Additionally, sensors may confuse one registration mark with another similar mark. Regardless of the cause, these detection errors can all lead to errors in the registration process and component positioning during product manufacture. As a result, the quality of the manufactured product may suffer, and the product itself may have to be discarded at a corresponding cost to the manufacturer.

It is also known to use registration marks which represent a specific binary code sequence referred to as a "perfect word." Perfect words are known to exhibit autocorrelation functions with low sidelobes when used in certain radar applications. In one registration system using perfect words, a matched filter compares each bit in a detected sequence of bits with corresponding bits in the perfect word. The filter output is then incremented by one for each matching pair of compared bits. Thus, in the case of a seven bit perfect word, the filter output will have a maximum amplitude of seven upon detecting a sequence of bits which completely matches the perfect word. As best understood, however, no change is made to the filter output in response to a non-matching pair of compared bits. Therefore, if all but one pair of compared bits match, then the filter output will have an amplitude of six (assuming a seven bit perfect word is used). Thus, the difference in the filter output for matching and non-matching inputs may be as small as one, as is the case in the single pulse registration systems described above.

As recognized by the inventors hereof, what is needed is a registration system which produces a filter output having a high amplitude in response to a matching input, and an advantageously lower amplitude, as compared to the prior art, for non-matching inputs.

SUMMARY OF THE INVENTION

In order to solve these and other needs in the art, the inventors hereof have succeeded at designing a system and method for detecting a registration mark associated with an object which provides improved resolution between matching and non-matching inputs. The registration mark preferably represents a binary code sequence of N bits, where N is an integer greater than one. Upon detecting a sequence of N bits with a sensor, the detected sequence is provided to a code matching filter, which compares the detected sequence with the binary code sequence and produces a detection signal representing the results of this comparison. Importantly, the code matching filter preferably increases a value of the detection signal for each matching pair of compared bits, and decreases the value of the detection signal for each non-matching pair of compared bits. In this manner, a penalty is assessed for mismatches. This results in a filter output having a high amplitude in response to a matching input, and a lower amplitude, as compared to the prior art, for non-matching inputs. For improved response, the binary code sequence is preferably a Barker code and, even more preferably, is a Barker code having roughly the same number of positive and negative bits. The present invention also provides a system for sampling and filtering a detected sequence of bits in such a manner as to avoid potential edge timing problems.

In accordance with one aspect of the present invention, a method is provided for detecting a registration mark associated with an object, where the registration mark represents a binary code sequence of N bits with each bit having one of two discrete values, and where N is an integer greater than one. The method of detecting the registration mark includes comparing N bits of a sensor signal with corresponding bits of the binary code sequence, and generating a detection signal in response to the comparing, including increasing a value of the detection signal for each matching pair of compared bits and decreasing the value of the detection signal for each non-matching pair of compared bits, the detection signal indicating detection of the registration mark when the detection signal exceeds a predefined value.

In accordance with another aspect of the present invention, a system is provided for detecting a registration mark associated with an object, where the registration mark represents a binary code sequence of N bits with each bit having one of two discrete values, and where N is an integer greater than one. The system includes a shift register configured to receive a sequence of N bits from a sensor, and a matching filter operatively connected to the shift register. The matching filter is configured to compare the sequence of N bits received by the shift register with the binary code sequence, and to generate a detection signal in response to the comparing. The matching filter is also configured to increase a value of the detection signal for each matching pair of compared bits, and to decrease the value of the detection signal for each non-matching pair of compared bits. The detection signal indicates detection of the registration mark when the detection signal exceeds a predefined value.

In accordance with yet another aspect of the invention, a method of detecting a sequence of bits having a known pattern includes sampling each bit of an input bit sequence at least twice to produce at least two versions of the input bit sequence, comparing each produced version of the input bit sequence to a reference bit sequence, and generating a detection signal in response to the comparing.

While some of the principal features and advantages of the invention have been described above, a greater and more thorough understanding of the invention may be attained by referring to the drawings and detailed description of preferred embodiments which follow.

BRIEF DESCRIPTION OF THE DRAWINGS

Corresponding reference characters indicate corresponding features throughout the several views of the drawings.

DETAILED DESCRIPTION OF PREFERRED EMBODIMENTS

Figure 1:
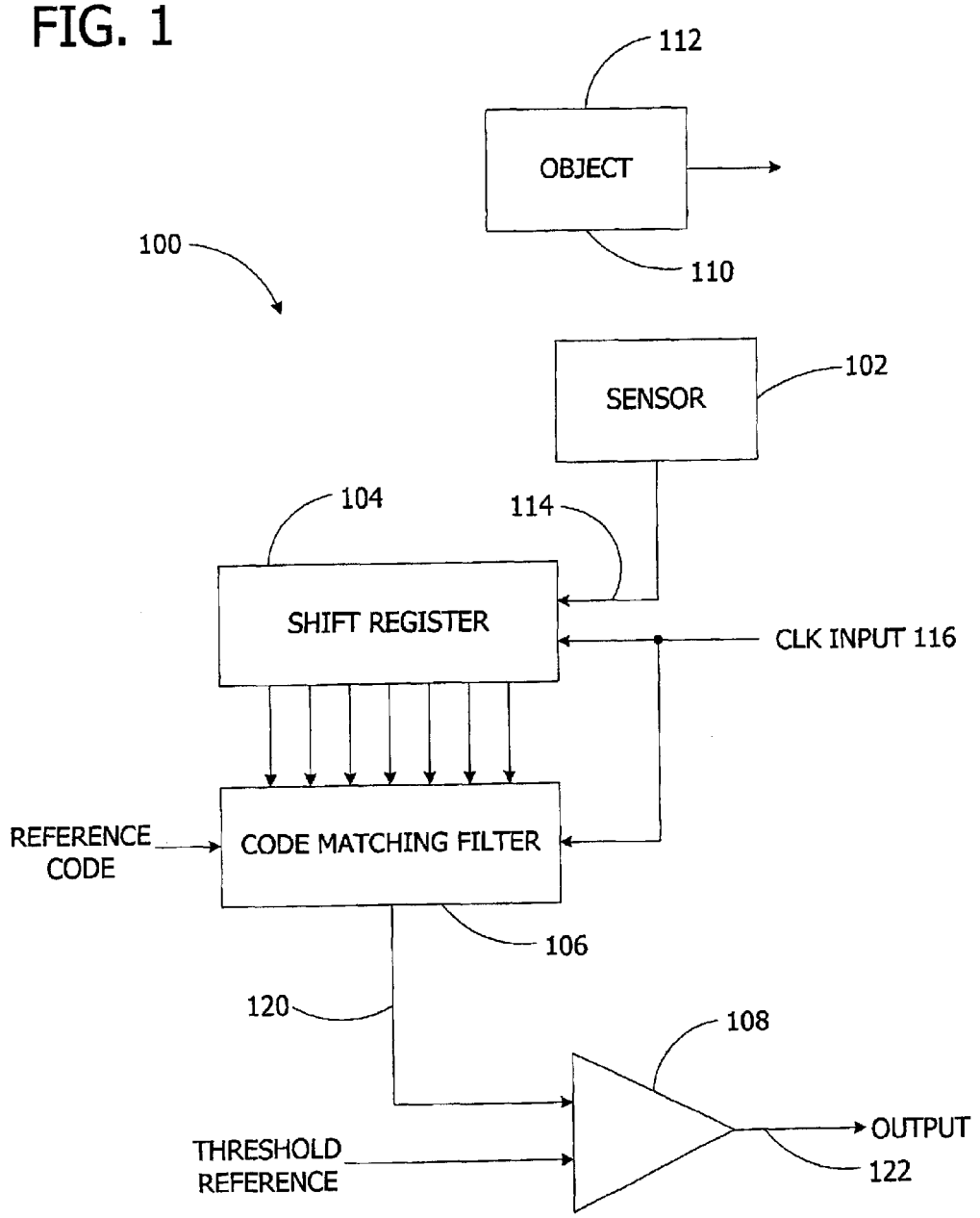
FIG. 1 is a block diagram of a system according to one preferred embodiment for detecting a registration mark associated with an object using matched filtering.

A system for detecting a registration mark associated with an object using matched filtering according to one embodiment of the present invention is illustrated in FIG. 1 and indicated generally by reference character 100. As shown in FIG. 1, the system 100 includes a sensor 102, a shift register 104, a code matching filter 106, and a comparator 108. With the exception of the sensor 102, the aforementioned components of the system 100 may be implemented in hardware or software, or a combination of both, as will be apparent.

The sensor 102 is provided for detecting a registration mark 110 applied to or otherwise associated with an object 112. As further explained below, the registration mark 110 represents a binary code sequence of N bits, where N is an integer greater than 1, and where each bit has one of two discrete values (e.g., 0 or 1, +1 or −1, etc.). As the object 112 moves relative to the sensor 102, the sensor sequentially reads each bit of the registration mark 110. As each bit is read, the sensor preferably outputs a value of either +1 or −1, corresponding to the value of the detected bit. This sensor output is provided to an input 114 of the shift register 104.

The shift register 104 has a bit storage capacity corresponding to the number of bits in the binary code sequence. In the particular embodiment under discussion, the registration mark 110 represents a seven bit sequence (which may or may not be a Barker code, as further explained below), and the shift register 104 is capable of storing seven bits, as shown in FIG. 1. However, other sequence lengths may be used without departing from the scope of the invention. The shifting of bits in the shift register 104 is controlled by a clock input 116 in a conventional manner. With each clock cycle, the content of each stage is shifted to the next higher stage (i.e., one stage to the left in FIG. 1), and a new bit is loaded from the shift register's input 114 into its lowest stage (i.e., the right-most stage in FIG. 1). Thus, as a sequence of bits are sequentially read by the sensor 102, a replicated version of the detected sequence is passed through the shift register 104, preferably in the form of plus and minus ones, and transmitted in parallel to the code matching filter 106.

The code matching filter 106 is preferably also controlled by the clock input 116. During each clock cycle, the code matching filter 106 compares each bit received from the shift register 104 with a corresponding bit of a reference code provided to the code matching filter 106. In this embodiment, the reference code is the binary code sequence represented by the registration mark 110. The results of the comparisons are then used to generate a detection signal 120 for input to the comparator 108. In addition to incrementing the detection signal 120 for each matching pair of compared bits, as further explained below, the code matching filter 106 preferably decrements the detection signal 120 for each non-matching pair of compared bits. In this manner, a penalty is assessed for each non-matching pair of compared bits. This results in greater resolution between the detection signal generated for a completely matching code sequence and the detection signal generated for any non-matching code sequence. A preferred manner for implementing this functionality will now be described with reference to FIG. 2.

Figures 2, 3:
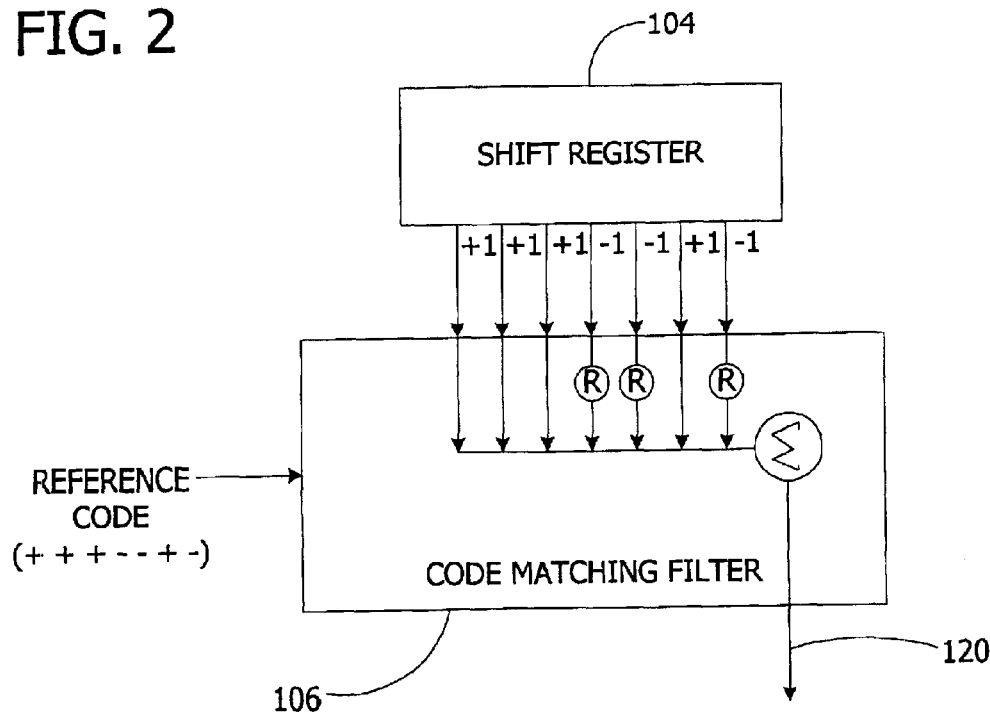
FIG. 2 is a block diagram illustrating one preferred implementation of the code matching filter shown in FIG. 1.
FIG. 3 is a table of known Barker codes.

As shown in FIG. 2, the code matching filter 106 sums the value of each bit received from the shift register 104, possibly after reversing the sign (i.e., polarity) of one or more such bits. The particular bits whose signs are reversed are determined according to the reference code provided to the code matching filter. For the particular embodiment illustrated in FIG. 2, the code matching filter 106 is provided with the following reference code: +++−−+−. Therefore, the polarity of the fourth, fifth and seventh bits received from the shift register 104 are reversed (as indicated by the ®'s in FIG. 2) prior to summing. Consequently, if the bits received from the shift register during a particular clock period match perfectly with the reference code, as shown illustratively in FIG. 2, then the polarity of all received bits having a value of −1 are reversed prior to summing, resulting in a detection signal having a maximum possible amplitude of seven. This process can also be described as multiplying each bit received from the shift register 104 by a corresponding bit in the reference code, where all such bits have a value of plus or minus one, and then summing the products of the multiplications.

In the implementation described above, the output of the sensor 102 at any given time is either a +1 or a −1, depending on the value of the detected bit. Alternatively, the sensor 102 may output only non-negative values (e.g., 0 or 1), with the code matching filter 106 providing appropriate logic to penalize the detection signal 120 for each non-matching pair of compared bits.

By incrementing the detection signal 120 for each matching pair of compared bits, the detection signal is provided with a maximum amplitude of N whenever the detected bit sequence received from the shift register 104 matches perfectly with the reference code, where N represents the number of bits in the reference code. Moreover, by decrementing the detection signal for each non-matching pair of compared bits, the amplitude of the detection signal is reduced as compared to the prior art when the detected bit sequence does not match the reference code. For example, if all but one pair of compared bits match, the detection signal produced in the prior art would be N−1, whereas in the present invention, the detection signal will be only N−2 (i.e., add one for each of the N−1 matches and subtract one for the mismatch). Thus, as compared to the prior art, the response of the code matching filter 106 to a non-matching input is notably reduced. This reduction may be even more striking where certain Barker codes are used, as explained below.

In the embodiment under discussion, the code matching filter 106 is an analog device, where the value of the detection signal 120 is represented by its amplitude. In other embodiments, the value of the detection signal 120 may be represented, for example, by a software variable, as a digital word, etc.

Referring again to FIG. 1, the detection signal 120 is provided to one input of the comparator 108 and a threshold reference is provided to another. When the detection signal 120 exceeds the threshold reference, the comparator provides a pulse at its output 122. In the particular embodiment under discussion, this pulse is intended to indicate that the detected bit sequence present in the shift register 104 matches perfectly with the reference code provided to the code matching filter 106. Thus, the threshold reference is preferably set to a level just above N−2 so as to ensure non-matching detected bit sequences do not produce pulses at the comparator output 122 while completely matching detected bit sequences do. By lowering the threshold reference, as compared to the prior art, the likelihood of missed matches is generally reduced without increasing the likelihood of falsely detected matches (i.e., mismatches detected as matches).

The teachings of the present invention are not limited to any particular detection means. On the contrary, the registration mark 110 can be coded for an optical, infrared, ultraviolet, magnetic, mechanical or any other suitable type of detection system. Furthermore, a wide variety of techniques can be employed for encoding the registration mark on the object. For instance, an optical or ultraviolet brightener may be used to encode the +1 bits of the binary code sequence on the object. An optical or ultraviolet sensor could then be used to sequentially read the positive bits of the sequence from the object, and to interpret the absence of a positive bit as a negative bit. In this manner, the registration mark 110 may comprise markings for the positive bits only, while still representing the entire binary code sequence. Alternatively, two different types of marks may be applied; one for positive bits and one for negative bits.

While the registration mark 110 has been described above as associated with a single object 112, it should be understood that the same registration mark may be applied to multiple objects, and/or to multiple portions of the same object, if desirable. Further, multiple registration marks, each representing a distinct binary code sequence, may be applied to a single object or series of objects. In such a case, multiple code matching filters may be employed, with each filter responding to a different one of the distinct registration marks.

In one preferred application of the invention, the object 112 is a component in a manufacturing process, such as a component in a process for manufacturing disposable absorbent articles (e.g., diapers, training pants, feminine care products, incontinence products, and the like). For instance, the object 112 may represent a graphical image or functional component of a child's training pant, where the component must be aligned with one or more other components during manufacture of the training pant. For this purpose, a registration mark representing a binary code sequence may be applied adjacent to or even within the graphical image to be registered, and then subsequently detected in the manner described above. It should be understood, however, that the teachings of the invention are not so limited, and may be applied to any application for detecting a registration mark associated with an object.

In one embodiment, the binary code sequence represented by the registration mark 110 is a Barker code. Barker codes (also referred to as "perfect codes") are used in radar for improved range detection accuracy, and allow operation at low radar transmitted power levels even in the presence of noise. Presently known Barker codes are shown in FIG. 3. The mathematical autocorrelation function (ACF) of a Barker code represents the results of applying a matched filter to the code, and will have a sharp peak of height N together with neighboring peaks, called sidelobes, having a height less than N. Ideally, the sidelobes will have a maximum height of one. The codes shown in FIG. 3 may also be combined into longer codes, referred to as "chained" Barker codes. For example, the five bit Barker code (+++−+) can be combined with the two bit Barker code (+−) to yield the following ten bit chained code: (+++−+) (−−−+−).

To approximate the ideal Barker response for the system 100 illustrated in FIG. 1, the binary code sequence represented by the registration mark 110 is preferably a Barker code in which the number of +1 bits differs from the number of −1 bits by only one. Thus, the registration mark 110 preferably represents a seven or eleven bit Barker code so as to minimize any adverse affects introduced through use of a two state sensor output (i.e., +1 or −1) in contrast to the three states present in a radar return (i.e., no signal, zero degree phase angle, and 180 degree phase angle). As a result of using a seven or eleven bit Barker code in the system 100 of FIG. 1, the detection signal 120 will have a minimal response (i.e., an amplitude of one or less) for most if not all mismatches. The seven and eleven bit Barker codes may also be used in reverse, with similar effect.

The clock input 116 provided to the shift register 104 and the code matching filter 106 is preferably synchronized with movement of the object 112 or the sensor 102 in such a manner that the shift register is not clocked at the same time that the output of the sensor changes state, which could otherwise yield one or more incorrect state values. In one specific application of the invention where an object bearing a registration mark to be detected is adhered to the surface of a rotating drum, the clock input may be generated, for example, by an encoder connected to a shaft of the rotating drum. The encoder clock may then be downsampled to an appropriate rate, if necessary.

Figure 4:
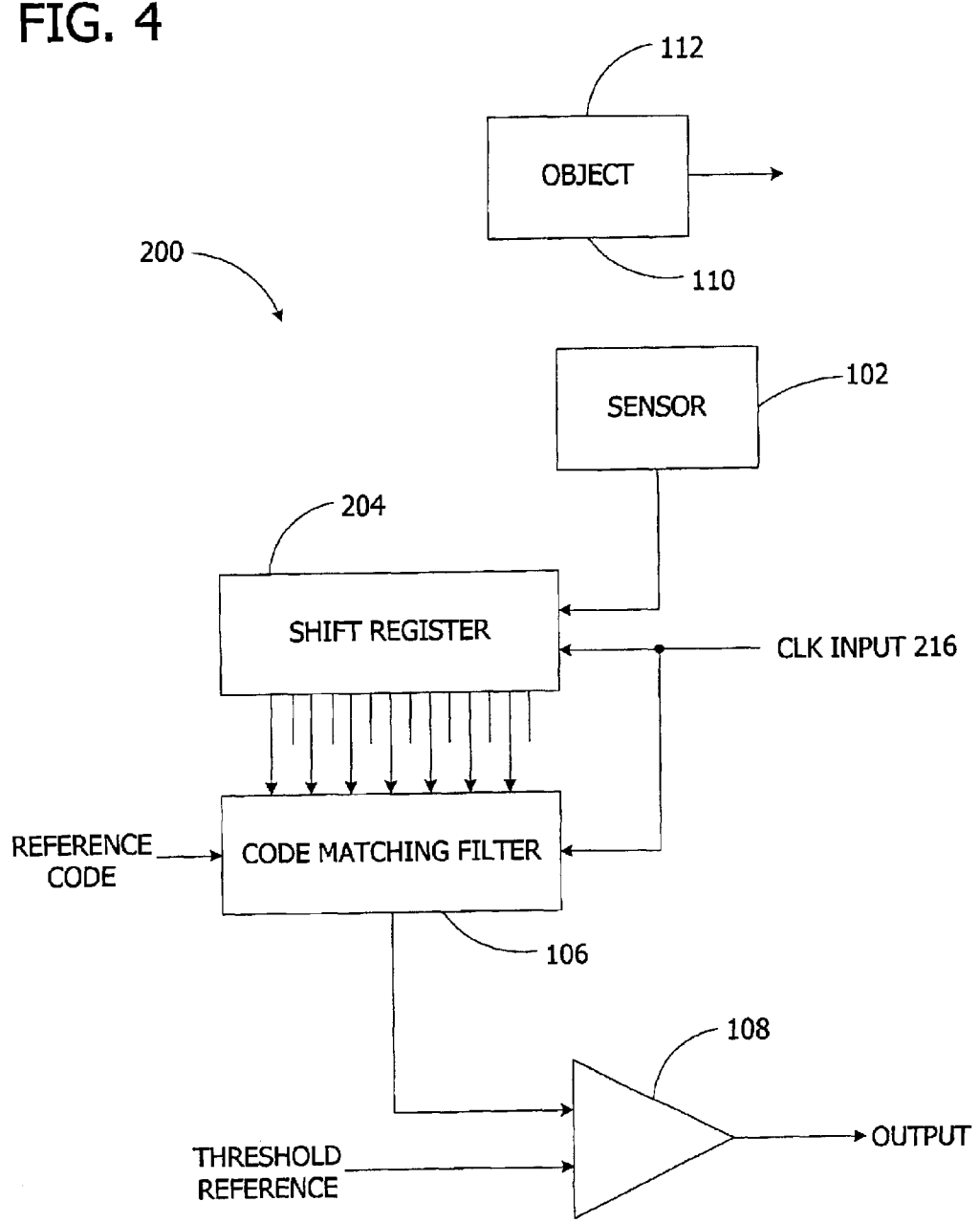
FIG. 4 is a block diagram of a system according to another preferred embodiment for avoiding potential edge timing issues.

As an alternative to synchronizing the clock signal as described immediately above, the system 200 shown in FIG. 4 may be used in lieu of the system 100 shown in FIG. 1. The system 200 is configured largely the same as the system 100, with two notable exceptions. First, a shift register 204 is provided which has twice as many stages as the shift register 104 shown in FIG. 1. As shown in FIG. 4, only every other stage (i.e., the odd set of stages) of the shift register 204 are provided to the code matching filter 106. Second, a clock input 216 to the shift register 204 and the code matching filter 106 is preferably twice as fast as the clock input 116 employed in FIG. 1.

Due to the faster clock input 216, the output of the sensor 102 is sampled twice by the shift register 204 during each subpulse (i.e., bit) of the binary code sequence represented by the registration mark 110. Thus, as a sequence of bits are sequentially read by the sensor 102, two replicated versions of the detected bit sequence are passed through the shift register 204. One version of the detected bit sequence will be present in the odd stages of the shift register, and the other version of the detected bit sequence will be present in the even stages of the shift register. These two versions of the detected bit sequence should normally be identical, unless one version contains errors as a result of sampling the output of the sensor 102 during a state transition. Even in that event, however, the other version of the detected bit sequence should not suffer from edge transition errors, and should accurately represent the sequence of bits read by the sensor 102. By sequentially processing each version of the detected bit sequence in the code matching filter 106 during each subpulse (i.e., bit) of the binary code sequence, the system 200 ensures that any matching sequence of bits read by the sensor 102 will not be missed due to an edge timing issue. While described in the context of detecting a registration mark associated with an object, it should be understood that this approach of the present invention to potential timing problems is applicable to any hardware implementation of a pattern matching function.

When introducing elements of the present invention and the preferred embodiments, the articles "a," "an," "the" and "said" are intended to mean that there are one or more such elements. The terms "comprising," "including" and "having" are intended to be inclusive and mean there may be additional elements other than those listed.

As various changes could be made in the above constructions without departing from the scope of the invention, it is intended that all matter contained in the above description or shown in the accompanying drawings shall be interpreted as illustrative and not in a limiting sense.

What is claimed:

1. A method of detecting a registration mark associated with an object, the registration mark representing a binary code sequence of N bits with each bit having one of two discrete values, where N is an integer greater than one, the method comprising:

comparing each bit of N bits of a sensor signal with a corresponding bit of the binary code sequence; and generating a detection signal in response to the comparing, including increasing a value of the detection signal for each matching pair of compared bits and decreasing the value of the detection signal for each non-matching pair of compared bits, the detection signal indicating detection of the registration mark when the value of the detection signal exceeds a predefined value.

2. The method of claim 1 wherein each bit of the N bits of the sensor signal has one of the two discrete values, and wherein the two discrete values are +1 and −1.

3. The method of claim 2 wherein generating the detection signal includes multiplying the value of each bit of said N bits of the sensor signal with the value of a corresponding bit of the binary code sequence, and summing results of the multiplying.

4. The method of claim 1 wherein the binary code sequence is a Barker code comprising approximately the same number of positive and negative bits.

5. The method of claim 4 wherein N is seven or eleven.

6. The method of claim 1 wherein the object is a component of a disposable absorbent article.

7. The method of claim 1 wherein comparing includes comparing each bit of N sequential bits of the sensor signal with a corresponding bit of the binary code sequence.

8. The method of claim 1 wherein the predefined value is approximately N-2 or less.

9. The method of claim 1 further comprising sensing for the registration mark with a sensor to generate the sensor signal.

10. The method of claim 1 further comprising sampling each bit of the sensor signal only once.

11. A system for detecting a registration mark associated with an object, the registration mark representing a binary code sequence of N bits with each bit having one of two discrete values, where N is an integer greater than one, the system comprising:

a shift register configured to receive a sequence of N bits from a sensor; and a matching filter operatively connected to the shift register, the marching filter being configured to compare each bit of the sequence of N bits received by the shift register with a corresponding bit of the binary code sequence, and to generate a detection signal in response to the comparing; and wherein the matching filter is configured to increase a value of the detection signal for each matching pair of compared bits and decrease the value of the detection signal for each non-matching pair of compared bits, the detection signal indicating detection of the registration mark when the value of the detection signal exceeds a predefined value.

12. The system of claim 11 wherein each bit of the sequence of N bits received by the shift register has one of the two discrete values, and wherein the two discrete values are +1 and −1.

13. The system of claim 12 wherein the matching filter is configured to multiply the value of each bit of the sequence of N bits received by the shift register with the value of a corresponding bit of the binary code sequence, and to sum results of the multiplying to produce the value of the detection signal.

14. The system of claim 11 wherein the binary code sequence is a Barker code comprising approximately the same number of positive and negative bits.

15. The system of claim 14 wherein N is seven or eleven.

16. A method of detecting a sequence of bits having a known pattern, the method comprising;

sampling each bit of an input bit sequence at least twice to produce at least two versions of the input bit sequence;

comparing each bit of each produced version of the input bit sequence to a corresponding bit of a reference bit sequence; and generating a detection signal in response to the comparing including increasing a value of the detection signal for each matching pair of compared bits and decreasing the value of the detection signal for each non-matching pair of compared bits, the detection signal indicating detection of the sequence of bits when the value of the detection signal exceeds a predefine value.

17. The method of claim 16 wherein the sampling is performed by a shift register having a clock input.

18. The method of claim 17 wherein the comparing is performed by a code matching filter having a clock input.

19. The method of claim 18 wherein the clock input to the shift register and the clock input to the code matching filter are the same.

20. The method of claim 16 wherein sampling includes sequentially sampling each bit of the input bit sequence at least twice.

* * * * *